United States Patent [19]
Haines

[11] Patent Number: 6,109,561
[45] Date of Patent: Aug. 29, 2000

[54] METHOD AND APPARATUS FOR CABLE DISPENSING AND PLACEMENT

[75] Inventor: Roger C. Haines, Branson, Mo.

[73] Assignee: Haines Cable Systems, Inc., Branson, Mo.

[21] Appl. No.: 08/668,338

[22] Filed: Jun. 25, 1996

Related U.S. Application Data

[63] Continuation-in-part of application No. 08/380,652, Jan. 30, 1995, Pat. No. 5,595,355, which is a continuation of application No. 07/642,109, Jan. 16, 1991, Pat. No. 5,421,501
[60] Provisional application No. 60/001,182, Jul. 14, 1995.
[51] Int. Cl.$^7$ .................................................. B65H 57/14
[52] U.S. Cl. .................................. 242/615.2; 242/598.3; 248/72
[58] Field of Search ........................... 242/615.2, 157 R, 242/566, 598.3, 598.4; 226/189, 194; 254/390; 384/418, 419; 248/74.2, 72; 193/37

[56] References Cited

U.S. PATENT DOCUMENTS

| | | | |
|---|---|---|---|
| 854 | 7/1838 | Tiffany | 254/400 |
| D. 283,171 | 3/1986 | Smith et al. | D34/21 |
| 479,423 | 7/1892 | Hoffman | 254/400 |
| 855,903 | 6/1907 | Packer | 193/37 |
| 872,480 | 12/1907 | Tilden | 242/118.61 |
| 1,245,231 | 11/1917 | Horton . | |
| 1,521,679 | 1/1925 | Godden | 193/37 |
| 1,550,614 | 8/1925 | Hunt | 384/419 |
| 1,565,195 | 12/1925 | Parsels | 193/37 |
| 1,652,695 | 12/1927 | Barber | 248/72 |
| 2,391,240 | 12/1945 | Houston . | |
| 2,391,272 | 12/1945 | Rose | 384/419 |
| 2,470,991 | 5/1949 | Kindorf et al. | 248/72 |
| 2,532,504 | 12/1950 | Lapsley | 254/134.3 R |
| 2,675,201 | 4/1954 | Friel | 248/72 |
| 2,678,786 | 5/1954 | Kindorf | 248/72 |
| 3,026,668 | 3/1962 | Latimer | 242/157 R |
| 3,045,975 | 7/1962 | Bolton | 254/390 |
| 3,053,368 | 9/1962 | Klahn | 384/419 |
| 3,094,833 | 6/1963 | Breffle . | |
| 3,098,638 | 7/1963 | McAuley . | |
| 3,249,337 | 5/1966 | Neumann . | |
| 3,507,457 | 4/1970 | Guild et al. . | |
| 3,719,348 | 3/1973 | Wells | 254/134.3 SC |
| 3,792,821 | 2/1974 | Fallon . | |
| 3,872,680 | 3/1975 | Nicholson et al. | 242/397.5 |
| 3,897,914 | 8/1975 | McCarthy et al. | 242/129.6 |
| 3,912,225 | 10/1975 | Earnheart | 254/134.3 R |
| 3,966,132 | 6/1976 | Gelin et al. . | |
| 3,984,732 | 10/1976 | Podrecca . | |
| 4,012,003 | 3/1977 | Cochran et al. . | |
| 4,050,561 | 9/1977 | Seitz | 193/37 |
| 4,074,871 | 2/1978 | Stotler . | |
| 4,202,509 | 5/1980 | Horn . | |
| 4,296,917 | 10/1981 | Day et al. | 254/400 |
| 4,345,678 | 8/1982 | Garnett | 384/419 |
| 4,537,106 | 8/1985 | Rider | 83/650 |
| 4,545,548 | 10/1985 | Kato et al. | 242/156 |
| 4,549,723 | 10/1985 | Castilano | 254/405 |
| 4,934,617 | 6/1990 | Lindgren | 242/157 R |
| 5,031,847 | 7/1991 | Tanaka . | |
| 5,167,399 | 12/1992 | Delomel | 254/134.3 R |
| 5,275,349 | 1/1994 | Tussing . | |
| 5,457,520 | 10/1995 | Schell et al. | 384/419 |
| 5,595,363 | 1/1997 | Leebeeck | 242/72 |

FOREIGN PATENT DOCUMENTS

| | | | |
|---|---|---|---|
| 593859 | 12/1977 | France | 242/615.2 |

*Primary Examiner*—John M. Jillions
*Attorney, Agent, or Firm*—Sheridan Ross P.C.

[57] ABSTRACT

An apparatus and method for forming wire bundles from a plurality of wire or cable is provided. A plurality of wires are withdrawn from a rack and simultaneously measured by a linear counter. The wires are cut at various positions to provide a bundle having beginning and ending points for the bundle as desired. A driven pulling spool is used to guide the bundle along a desired path. The pulling rope is preferably attached to the bundle by an inflatable bladder. Rollers for guiding the cable include flared end flanges with diameters equal to the shaft diameter of the roller. Clips for holding the rollers to a cable tray provide for ease of repositioning cables.

11 Claims, 9 Drawing Sheets

METHOD AND APPARATUS FOR CABLE DISPENSING AND PLACEMENT

This application is a continuation-in-part of U.S. patent application Ser. No. 08/380,652, now U.S. Pat. No. 5,595,355 for Method and Apparatus for Cable Dispensing, which is a continuation of application Ser. No. 07/642,109, filed Jan. 1, 1991, now U.S. Pat. No. 5,421,501, both of which are incorporated herein by reference. This application claims the benefit of U.S. provisional application Ser. No. 60/001,182 filed Jul. 14, 1995, incorporated herein by reference.

BACKGROUND INFORMATION

The present invention relates to a method and apparatus for dispensing and positioning strands of wire or cable and in particular to dispensing wire or cable for forming a bundle and placement of the bundle.

In the construction industry, it is commonly necessary to position a plurality of wires, cables, or the like along similar paths. Typically, the plurality of wires or cables are formed into a bundle and the bundle is put into position such as by pulling it along a desired path.

The process of forming and positioning a bundle is particularly difficult when the individual wires or cables in the bundle must have different starting and/or ending points. FIG. 1A illustrates schematically a bundle, consisting of three wires 10, 12, 14 which are, following positioning, intended to extend between beginning and ending terminals 10a, 10b, 12a, 12b, 14a, 14b, respectively. Because, in the example shown, the beginning and ending terminals 10a, 10b, 12a, 12b, 14a, 14b do not coincide for any of the wires 10, 12, 14, the bundle which is to be pulled along the desired pathway is preferably formed as shown in FIG. 1B. Of particular note is that none of the starting or ending points of the three wires 10, 12, 14 occur at the same point along the bundle 16.

According to previous methods, a bundle such as the bundle 16 shown on FIG. 1B would be formed by extracting each length of wire 10, 12, 14, separately. Typically, the wires 10, 12, 14 would each be pulled from a wire spool, measured, such as with a tape measure, and laid on the surface such as the ground or a floor surface. Next, the three wires 10, 12, 14 would be moved lengthwise, relative to each other, until they had the configuration shown in FIG. 1B. At this point, the wires 10, 12, 14 could optionally be permanently or temporarily held together such as by using cable ties or the like. The bundle 16 thus formed would then be in a configuration such that it could be pulled along the desired pathway.

Once the bundle 16 is formed, it is moved to the initial point of the pathway along which it is to be pulled. Typically, it is moved by pulling or carrying the bundle. Next, the bundle is placed along the desired pathway. According to one method a rope is first placed along the desired pathway, one end of the rope is attached to one end of the bundle and the rope is pulled from the other end, thus pulling the bundle along the desired path. In previous devices, cable was sometimes pulled along a path using a motor. Such motors typically have one or a few rates of pull, making it impossible to accurately adjust the rate of pull to the conditions. Typically, the motor was attached to a portion of the building, such as a beam or a wall. This placed undesirable constraints on where the motor can be positioned so that pulling efficiency was reduced. Pulling efficiency is typically greatest when the pulling apparatus is positioned near one end of the pathway. Because of the need to attach the motor to the building, a large amount of time was required to set up the motor to achieve a pull.

The process of pulling each individual wire, measuring each individual wire, and moving the wires until they have the desired configuration relative to each other is labor-intensive and thus expensive. Furthermore, even when starting or ending points coincide, the process is prone to error, particularly when a large number of wires, such as different gauge wires, are used to form the bundle. Additionally, once the bundle is formed, transporting the bundle to the entry point of the pathway along which it is to be pulled is cumbersome.

In some instances, it has been found useful to position one or more rollers along the desired pathway in order to help guide the bundle as it is being moved. In some cases, it is convenient to form a roller from a length of pipe such as PVC pipe 18 (FIG. 2). In order to provide for axial mounting of the pipe 18, endcaps 20 are press-fitted into the ends of the pipe 18. The endcaps 20 may have hubs 22 for axially mounting the rollers thus formed. The rollers formed according to the configuration shown on FIG. 2, however, have been found to be susceptible to permitting the cable which it supports to slip over the end 24 of the roller, thereby often causing the cable to bind or even damaging the cable.

SUMMARY OF THE INVENTION

The present invention relates to a method and apparatus which, among other things, reduces the time and effort necessary to form and place bundles, compared to the previous methods used. According to one embodiment of the invention, a clip is provided for holding a roller adjacent a cable tray with provision for quickly releasing the roller from the clip, e.g. for re-positioning the cable from a position above the roller to a position below the roller.

According to one embodiment of the present invention, two or more sources of wire are provided on a rack. As used herein "wire" refers to any filamentous material, preferably electrical wire or electrical cable, but including also material such as plastic or other non-electrical wire or cable, rope, chain, optic fibers, and the like. One or more of the wires is connected to a counter. A first length of the first wire is pulled or dispensed from the rack using the counter to measure the length which is removed. Preferably, the removed wire or wires are held on a holding spool. The holding spool may be freely rotatable or driven.

After a first length of wire is removed, a second length of wire is placed adjacent the first wire and the two (or more) wires are thereafter removed or pulled from the rack together. In this way, since wires are removed simultaneously, it is not necessary to individually pull each length of wire. Furthermore, since the first predetermined length is calculated to correspond to a desired bundle configuration, it is not necessary to adjust the position of the individual wires in order to obtain the desired bundle configuration.

The process is continued by adding further wires to the bundle and/or cutting wires to fix their terminal position in the bundle. Eventually, the last wire in the bundle is cut and thus the bundle will have been formed in one pulling operation, i.e., without the need for separately pulling each wire of the bundle and/or without the need for positioning the wires relative to each other after they have been withdrawn from their rack and cut.

The bundle is then transported near one end of the desired pathway for the bundle. This can be done by transporting the holding spool to such location or by transferring the bundle to a secondary spool which is then moved near one end of the desired pathway. It is also possible to pull the bundle as it is being measured and formed directly into the desired pathway without first storing it on the holding or secondary spool.

Preferably, a rope connected to a driveable pulling spool has been positioned along the desired pathway and connected to one end of the bundle. Upon driving the driveable pulling spool, the rope is wound onto the pulling spool and the bundle is pulled along the pathway formerly occupied by the rope thus positioning the bundle as desired.

To assist in guiding the bundle, rollers can be provided with fluted endcaps, continuous with the outside diameter of the cylindrical roller, to prevent binding or damage to the bundle. Preferably the fluted endcaps have flat outer faces which can be mounted back-to-back to provide a multi-channel roller. Rollers can also be provided in conjunction with one or more guide rollers preferably placed perpendicularly to the main rollers.

DETAILED DESCRIPTION OF THE PREFERRED EMBODIMENT

Figure 3:
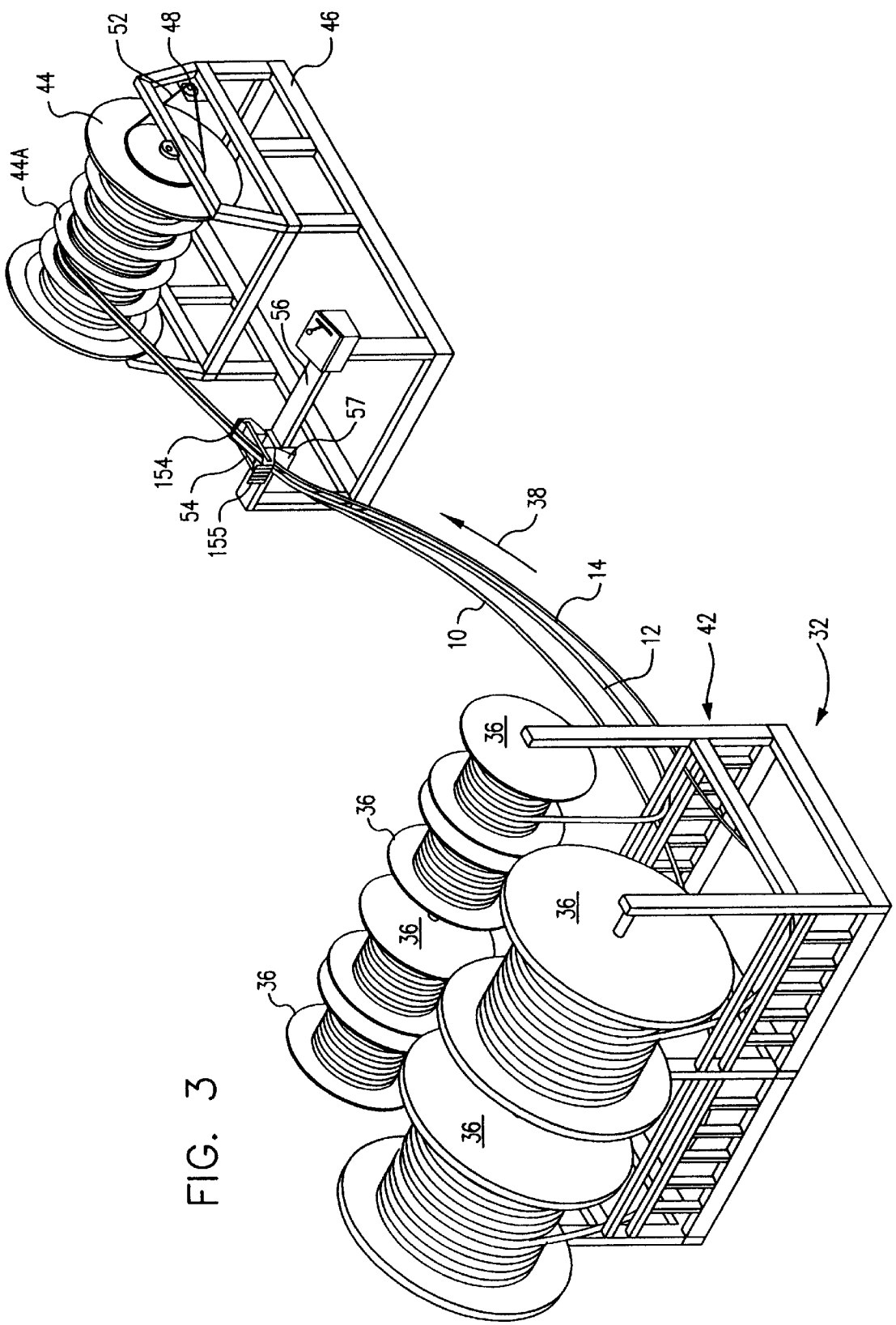
FIG. 3 is a perspective view of a portion of a rack with wires therefrom connected to a holding spool.

As depicted in FIG. 3, a reel rack 32 includes a plurality of upright members 34 for supporting a plurality of wire or cable reels 36. Preferably the rack 34 is configured to accommodate a range of reel sizes, such as spools up to 72,000 pounds, 12 feet diameter, 8 feet wide. The reels are rotatably mounted so that the reel contents can be withdrawn from all of the reels generally in a first direction, such as that indicated by arrow 38. In one embodiment, a lattice 42 is provided so that wires or cables withdrawn from the reels 36 can be guided by inserting through openings in the lattice 42. According to one embodiment of the invention, the supply spools 36 can be driveable, such as by providing an electric motor for one or more of the supply spools.

Figure 7:
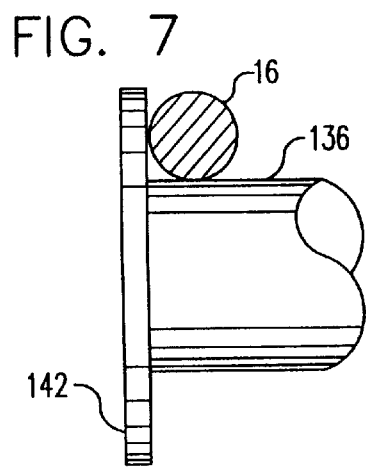
FIG. 7 is a schematic depiction of a roller and a portion of a cable which is not smoothly fluted.

A holding reel 44 is mounted on a stand 46 to permit rotation of the holding reel 44. In one embodiment, the holding reel 44 is connected to a motor 48 by a chain or belt 52 to permit the holding reel 44 to be driven. The holding reel 44 may be configured with a plurality of partitions 44a, as seen in FIG. 7, so that the holding reel 44 can be used to form a plurality of bundles. Preferably, the holding reel 44 is transportable, such as by a front-loader 94.

Adjacent the holding reel 44 is a linear counter 54. The linear counter 54 may be any of a number of linear counters known in the art. One example of a linear counter that can be used is Model 1704, available from Reel-O-Matic. The linear counter 54 receives a length of wire, cable, or other filamentous material. As the wire or cable is drawn through the counter 54, the counter 54 provides an indication of the length of wire which has passed through the counter 54.

In one embodiment, a device is provided to guide wire or cable onto the holding reel 44 so that it is coiled onto the holding reel 44 in an ordered helical fashion. The device for guiding the wire or cable onto the holding reel 44 can be part of or attached to the linear counter 54 by slideably or movably mounting the counter 54 onto a beam 56 so that by driving or moving the counter 54 along the beam 56, such as with an electric motor 57, the cable is guided onto the reel 44 as desired. Rather than using the counter 54 to guide the wire or cable, a separate yoke can also be used to guide wire onto the holding reel 44.

Additional counters similar to counter 54 can be provided, such as by providing a counter for each of the reels 36 on the rack 32. Additional counters can be used, for example, to indicate the amount of cable remaining on the reels 36. In this way, it is possible to determine whether sufficient wire remains on the reels 36 before composition of a new bundle is undertaken. This is particularly important in the present invention since the bundle is developed as wire is being withdrawn from the reels, so that if insufficient wire or cable is on one of the reels 36, the bundle being formed would normally have to be re-formed from the beginning.

After the bundle is formed on the holding reel 44, it is preferably transported to a location near the site where it will be installed. This can be achieved either by making the reel 44 movable to the site or by spooling the bundle from the holding cable 44 to a secondary spool 45, depicted in FIG. 4. The secondary spool 45 is supported on a stand 47. The secondary spool 45 is preferably free to rotate on the stand 47, but may be configured to permit the reel 45 to be driven. Preferably, the stand 47 is configured for easy attachment to a transportation device, such as a front-loader or other type of tractor 94.

Figure 1A:
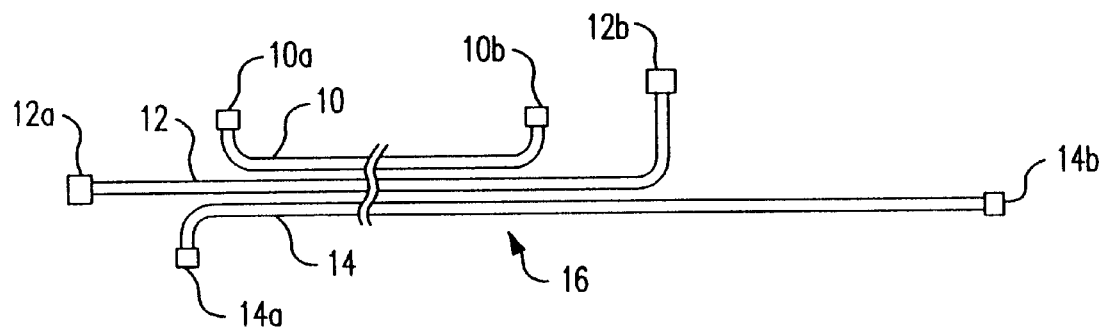
FIGS. 1A and 1B are schematic diagrams of a bundle in position and a bundle before positioning.
Figure 1B:
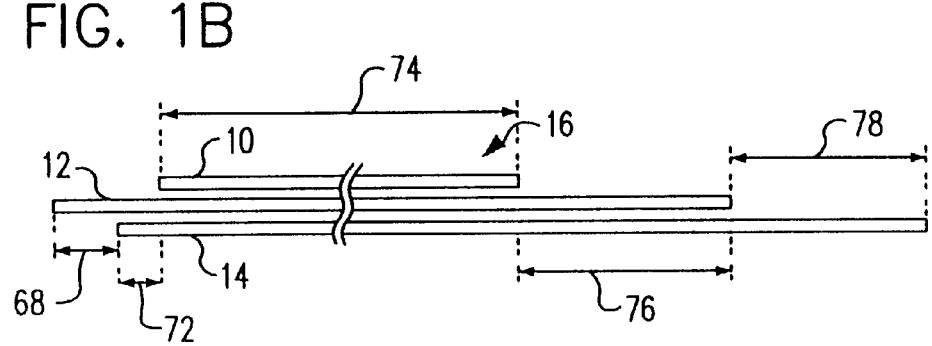
Figure 2:
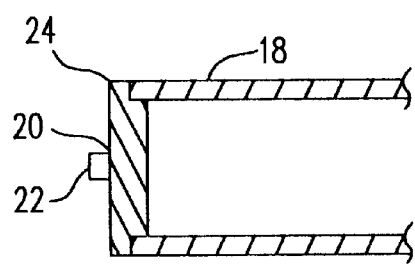
FIG. 2 is a schematic cross-section of a portion of a roller according to previously used devices.

As depicted in FIG. 3, in operation, strands of wire or cable 10, 12, 14 are withdrawn from the reels 36 for formation of a bundle. In the following discussion, the bundle formation will be described for a bundle configured as shown in FIG. 1A. The procedure for configuring other bundles will be apparent to those skilled in the art. The first wire 12 is removed from the desired reel 36 and inserted into the linear counter 54. A desired length 68 of the first wire 12 is pulled through the counter 54 and wound onto the holding reel 44. The first wire 12 is wound onto the reel 44, such as by driving the reel 44 using the motor 48. The second wire 14 is then withdrawn from a second reel 36, and a second length 72 of both the first wire 12 and the second wire 14 is simultaneously wound onto the holding reel 44. Although the counter 54 is directly measuring only the first cable 12 at this point, it is capable of also measuring the length of the second wire 14 as it is pulled from the rack, since the first and second wires 12, 14 are being wound onto the holding reel 44 at the same rate. Thus, the length of the first wire 12 which is measured is also the length of the second wire 14 which is being withdrawn. The third wire 10 is then withdrawn from a third reel 36 and positioned next to the first two wire 12, 14 in the vicinity of the counter 54. A third length 74 of the three wire 12, 14, 10 is then wound onto the holding reel 44. The third wire 10 is then severed in the vicinity of the counter 54. A fourth length 76 of the first and second wire 12, 14 is then wound onto the holding reel 44. The first wire 12 is then severed in the vicinity of the counter 54. Since wire 12 is the wire which is being measured by the counter 54, in order to continue, it will be necessary to insert the second wire 14 into the counter 54. A fifth length 78 of the second wire 14 is then wound onto the holding reel 44 and the second wire 14 is then severed in the vicinity of the counter 54. At this point, a bundle of the configuration depicted in FIG. 1B has been formed and wound onto the holding reel 44. The bundle 16 is wound onto the holding reel 14 such that one of the ends of the bundle is free to permit access to that end of the bundle. The procedure has included simultaneously withdrawing a plurality of wires of predetermined lengths.

According to one embodiment, the apparatus shown in FIG. 3 can be used to form additional bundles on to holding reel 44, for example, on other segments of the reel 44. Bundles which have been formed on the reel 44 are preferably transported to a location near one end of the region where the bundle is to be positioned. According to one embodiment, a secondary reel 45 is positioned adjacent the holding reel 44, (e.g. using a front-loader 94) the outermost end of one of the bundles on the reel 44 is attached to the spool of the reel 45, and reel 45 is rotated to draw the bundle onto the secondary reel 45. The secondary reel 45 is then transported to the desired location, such as by using a front-loader tractor or similar device 94. According to another embodiment, the holding reel 44 is located adjacent one end of the pathway along which the bundle is to be positioned.

Figure 4:
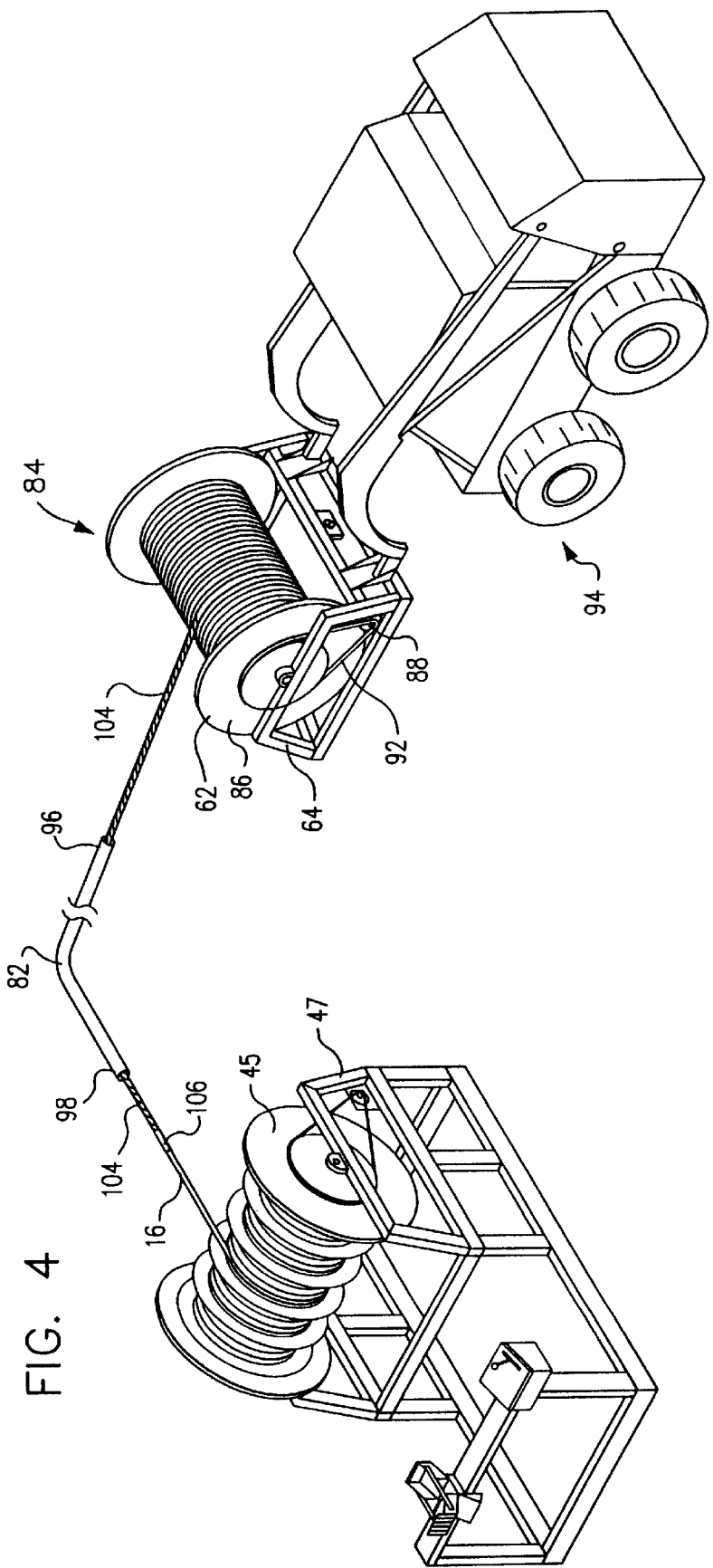
FIG. 4 is a partial schematic perspective view of a pulling spool having a rope connected to a cable on a holding spool.

FIG. 4 depicts an embodiment which the bundle 16 is to be positioned through conduit 82. As will be apparent to those skilled in the art, the method and apparatus described herein can also be used to position bundles, cable, or wire along wire troughs, wire trays, cable trays and wire ways. As depicted in FIG. 4, a tugger 84 is provided, which includes a pulling reel 86 connected to a motor 88 by a cable or belt 92. Preferably, the tugger 84 is driven by a hydraulic system capable of pulling about 9,000 pounds. Preferably, the pulling speed is variable, such as to provide pulling reel revolutions per minute from 0 to about 70. Preferably, the tugger 84 is configured for attachment to a front-loader 94 tractor or similar device. In this way, the tugger 84 can be located near the end 96 of the pathway or conduit 82 opposite the end 98 where the bundle 16 is initially located. The tugger can be provided with a guide device, such as a yoke, to guide the rope onto the spool.

Preferably, the tugger 84 includes a device for determining the amount of force or pressure exerted during the pulling operation. A matter of some concern during pulling cable or bundles of cable or wire is the amount of force or pressure experienced by the cable during the pull. Excessive force or pressure can indicate damage to the cable during the pull. When motors were used for pulling cable, motor amperage was sometimes used as an indicator of pressure on the cable. However, this provides only an indirect indication and is often inaccurate. In a preferred embodiment, the device for determining force or pressure is a direct hydraulic measurement device. A gauge 102 (FIG. 10) or similar readout means may be provided for indicating force or pressure.

Figure 11:
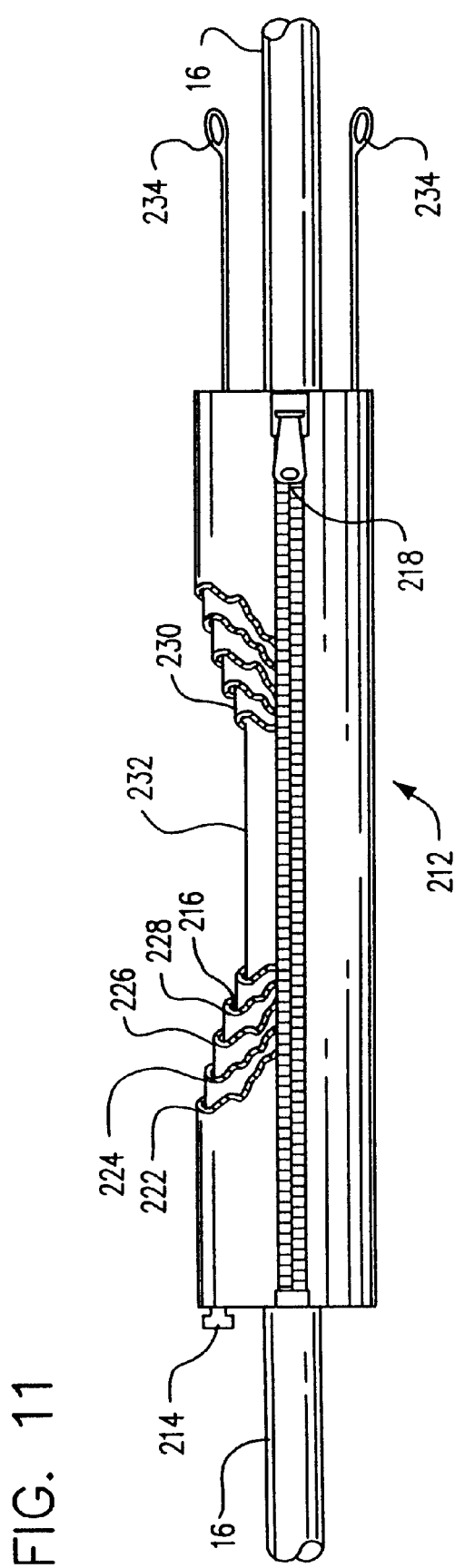
FIG. 11 depicts an inflatable sleeve for cable attachment.

A rope 104 is wound onto the pulling reel 86. A length of the rope 104 is withdrawn from the pulling reel 86 and threaded along the pathway 96, 98 where the bundle 16 is to be positioned. The end of the rope 104 is attached to the free end of the bundle 16. One method for attachment of the rope 104 to the bundle 16 is by way of a braided sheath 106. The braided sheath 106 is braided in a fashion that causes the diameter of the sheath to diminish in response to a pulling motion on one end of the sheath, in a manner similar to a so-called Chinese finger trap. However, this method of attachment has been found to sometimes cause damage to the cable. Furthermore, this method of attachment is not readily applicable for attachment to an intermediate section of cable, e.g., to guide a bundle into a blind conduit (i.e., one without an outlet). According to one embodiment of the present invention, attachment is accomplished by way of an inflatable sleeve or sheath 212 (FIG. 11). The inflatable sheath 212 is a generally cylindrical-shaped sheath having inner and outer walls with a space therebetween 216 coupled to a valve 214 to permit pressurization or inflation of the area 216 between the walls. Preferably, the inner and outer walls are multi-layered. In one embodiment, the outer walls include an outer rubber-canvas layer 222, a braided metal mesh layer 224, a second rubber-canvas layer 226, and the outer wall 228 of a rubber air bladder. The inner wall includes the inner wall 230 of the rubber air bladder and a ribbed gripping lines 232, preferably formed of a rubber-canvas mentioned. Preferably, the sheath 212 contains a fastenable opening, such as a zippered opening 218 to make it easier to position the uninflated sheath 212 around the end of a bundle 16. After positioning the uninflated sheath around the bundle 16, the sheath 212 is inflated such as by connecting the valve 214 to a source of pressurized air. The pressurized sheath 212 exerts a pressure inward onto the bundle 16 so that the inflated sheath 212 is frictionally and releasably attached to the end of the bundle 16. Following inflation of the sheath 212, the rope 104 can be attached to pulling eyes 234 connected to the sheath 212, and used to pull the bundle 16.

The pulling reel 86 is then rotated by the motor 88 (FIG. 4), causing the rope 104 to be wound onto the reel 86 and, in turn, causing the bundle 16 to be drawn along the pathway to the conduit 82. During the pulling process, the pressure or force meter 102 provides an indication of the amount of force applied to the bundle 16. After the pull is completed, the rope 104 is rolled onto the pulling reel 86, and the tugger 84 is in condition to be moved to a position for the next pull, e.g., by front-loader 94.

According to another embodiment of the invention, the bundle 16, as it is formed, is not positioned onto a holding reel 14, but rather is drawn directly into the pathway 82. In this embodiment, wires are withdrawn from the reels 36, as described above, but, after being sent through a counter 54, are attached to the rope 104, rather than being wound onto the holding reel 44, so that the bundle is being formed as it is being drawn along the desired path.

Figure 10:
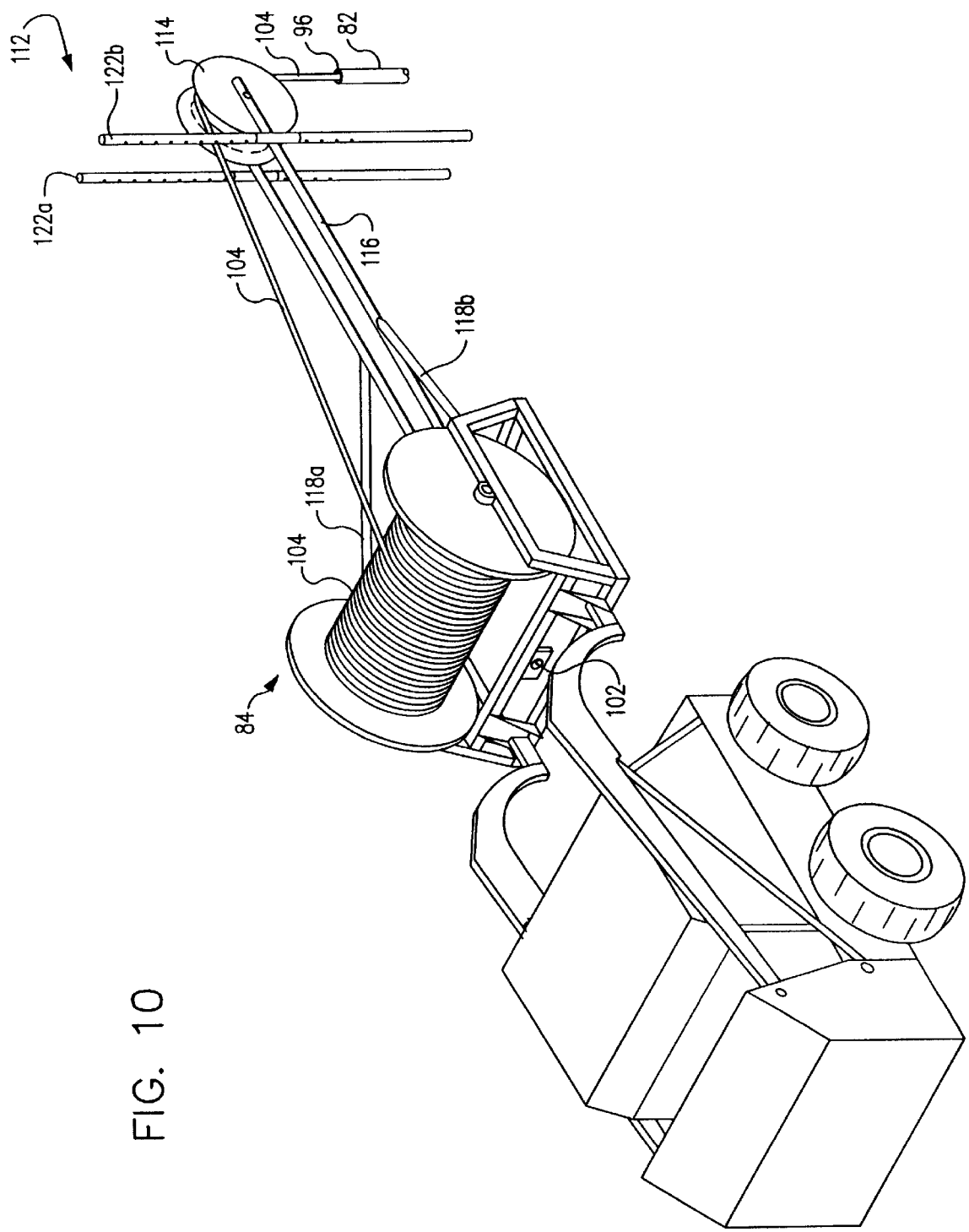
FIG. 10 is a perspective view of a pulling reel with a pulling attachment.

According to another embodiment of the invention, the tugger 84 is provided with an attachment 112 (FIG. 10). The attachment 112 includes a guiding device, such as a pulley 114 and a device for positioning the pulley 114, with respect to the tugger 84. Other devices which might be used to guide include low friction sliding guides, roller bearings, and the like. In the embodiment depicted in FIG. 10, the device for positioning the pulley includes a series of arms. The first arm 116 extends outward from the tugger 84 and is held in place partially by bracing arms 118*a*, 118*b*. Upright arms 122*a*, 122*b* extend downward from the first arm 116 to rest against a surface such as a ground surface or a floor surface. The upright legs are preferably adjustable so that the guiding device 114 can be positioned a desired height above the surface or floor. Because the guiding device 114 is substantially smaller than the tugger 84, the guiding device 114 can be positioned in small spaces adjacent the conduit 82 to permit efficient pulling or tugging of wire or cable, even though the tugger 84 may be too large to be positioned immediately adjacent the end 96 of the pathway 82.

Figure 5:
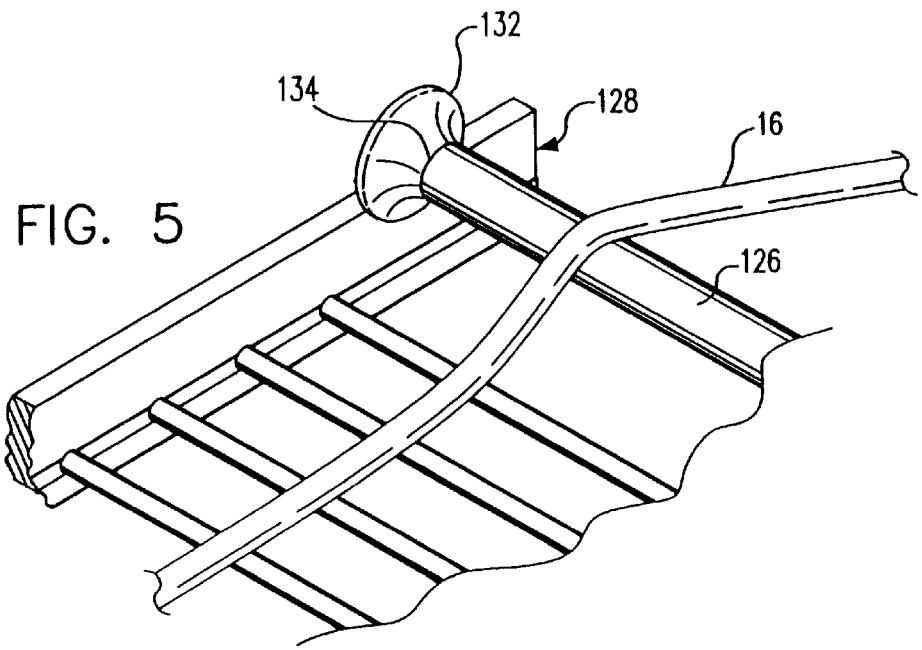
FIG. 5 is a partial schematic perspective view of a guide roller according to one embodiment of the present invention.

FIG. 5 depicts a roller 126 for guiding the bundle 16 and/or the rope 104 along a pathway, such as a wire trough 128. The roller 126 has a flared end flange 132. The external junction 134 of the roller shaft 136 and the flange 132 forms a smooth continuous surface without a shoulder or edge.

Figure 8:
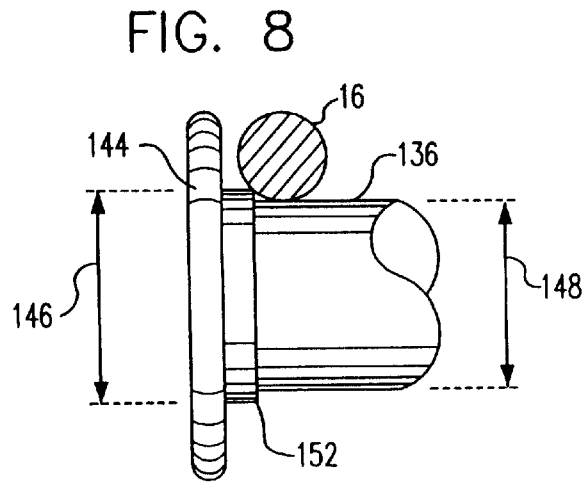
FIG. 8 is a elevational schematic view of a roller and portion of a cable with an endcap having a shoulder.

FIGS. 7 and 8 depict other types of end portions of rollers, and the difficulties which would be found in these other types of end portions. In FIG. 7, the end portion 142 is not flared so that the surface of the shaft 136 is perpendicular to the interior surface of the flange 142. This can cause the bundle or wire 16 to be forced into the corner formed between the flange 142 and the shaft 136 and to bind therein, defeating the purpose of the roller 126, which is to facilitate movement of the bundle 16 along the pathway. In the device shown in FIG. 8, the end flange 144 has a diameter 146 where it meets the shaft 136, which is larger than the diameter 148 of the shaft 136. This creates a shoulder 152 which can bind or damage the cable or bundle 16.

Figure 6:
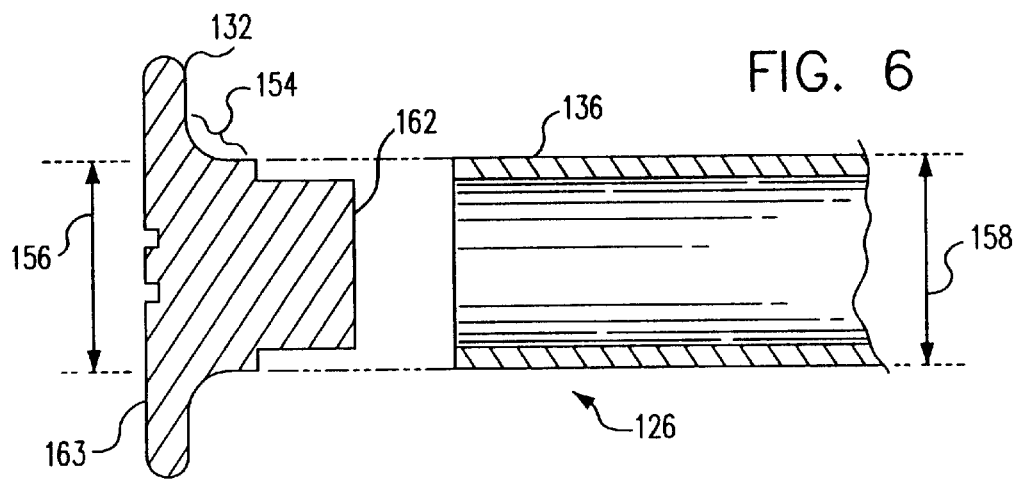
FIG. 6 is a cross-sectional, partly exploded view of a portion of a roller with an end flange according to the present invention.

According to one preferred embodiment, as shown in FIG. 6, the roller 126 is formed from a flange 132 which has a flared portion 154 and has a diameter 156 where it meets the shaft 136, which is equal to the diameter 158 of the shaft 156. The flange 132 is preferably formed from polyvinyl chloride (PVC) or similar material and has a plug portion 162 with a diameter to permit it to be press-fit into a hollow shaft 136. Preferably, the shaft 136 is formed from PVC pipe. The exterior face 163 of the flange 132 is preferably substantially planar or flat. In this way, two flanges 132 can be placed face-to-face to produce a roller 126 having one or more flared dividers 163', as depicted in FIG. 9.

Figure 9:
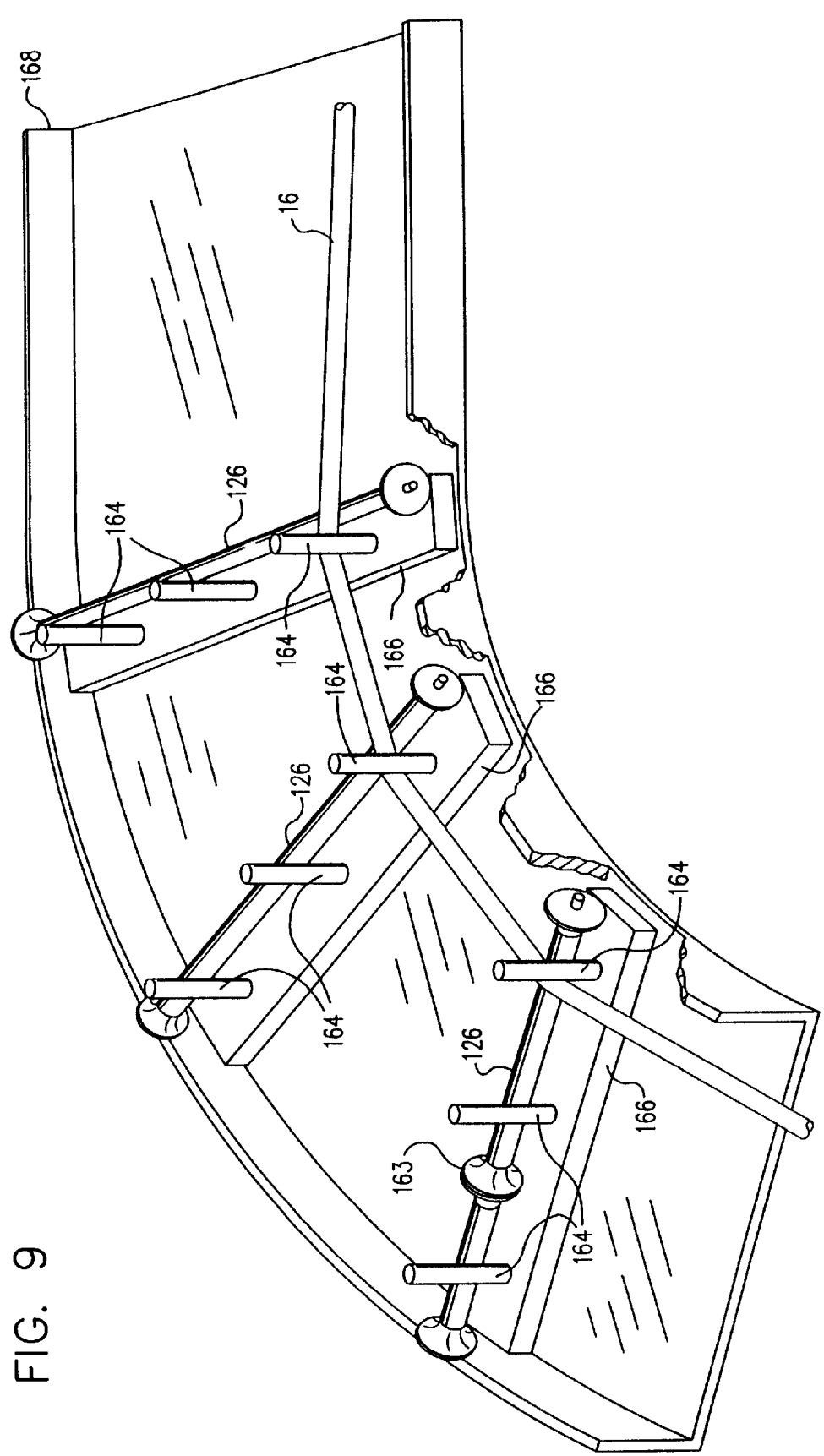
FIG. 9 is a schematic perspective view of rollers with vertical guide rollers according to one embodiment of the present invention.

According to another embodiment of the present invention, the rollers 126 can be positioned adjacent and substantially perpendicular, such as vertical rollers 164 (FIG. 9). In the configuration depicted in FIG. 9, both the main rollers 126 and the perpendicular rollers 164 are rotatably attached to holders 166. The main roller/vertical roller device is useful in guiding the cable 16 along a curved path, such as through a curved wire trough 168.

Figure 12:
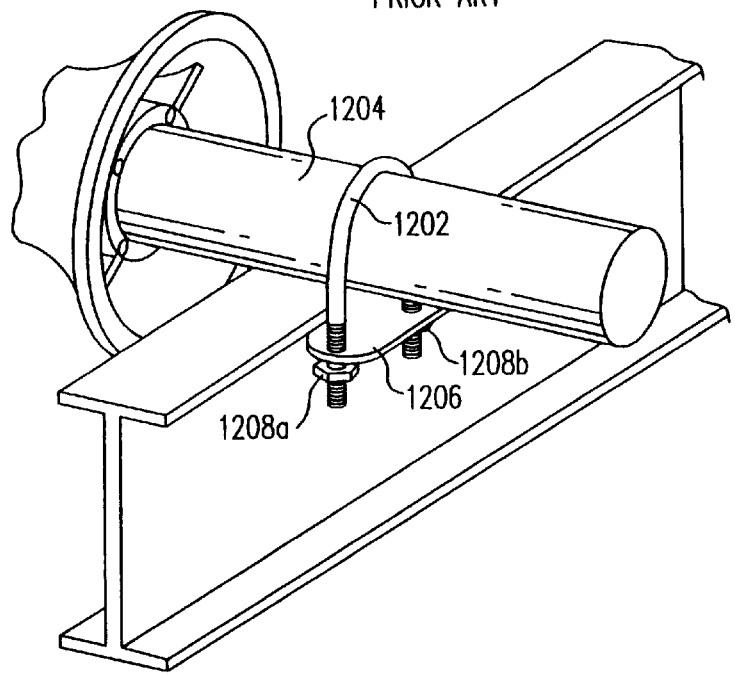
FIG. 12 depicts connection of a roller axle to a cable try according to previous devices.

FIG. 12 depicts one fashion of fastening a roller to an I-beam portion of a cable tray according to previous methods. In the depicted device, a U-bolt 1202 is used to clamp a roller axle such as 1204 to the I-beam using a beam clamp such as that known as a Korn clamp 1206. One problem of using a beam clamp such as a Korn clamp is that it is relatively slow to release the clamp so that the axle 1204 can be released. For example, it may take about two minutes or more to loosen the nuts 1208*a*, 1208*b*, which hold the clamp 1206. This can be disadvantageous particularly because it is often desirable to release the axle 1204 from the cable tray in order to reposition cable or conduit from a position above the roller 1210 to a position underneath the roller. Depending on the cable pulling operation being performed, it may be necessary to release the axle 1204 multiple times and/or in multiple locations and thus the amount of time required to release the axle 1204 can, cumulatively, become significant on a given job.

Figure 13:
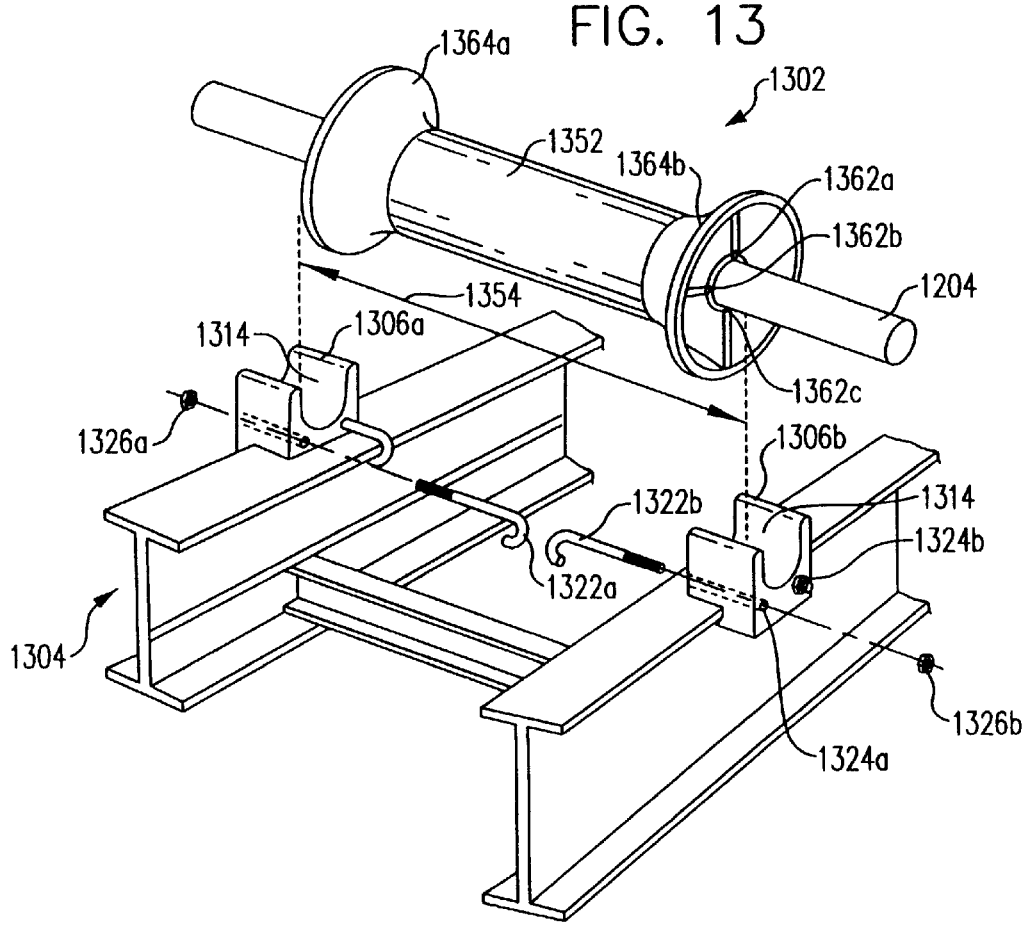
FIG. 13 is a partial perspective view depicting a clip for connecting a roller to a cable tray according to an embodiment of the present invention.
Figure 14:
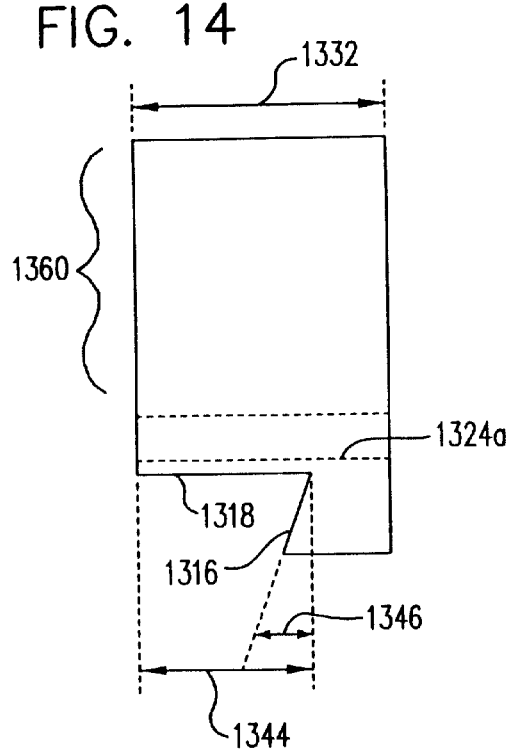
FIG. 14 is a side elevational view depicting a clip for connecting a roller to a cable tray according to an embodiment of the present invention.
Figure 15:
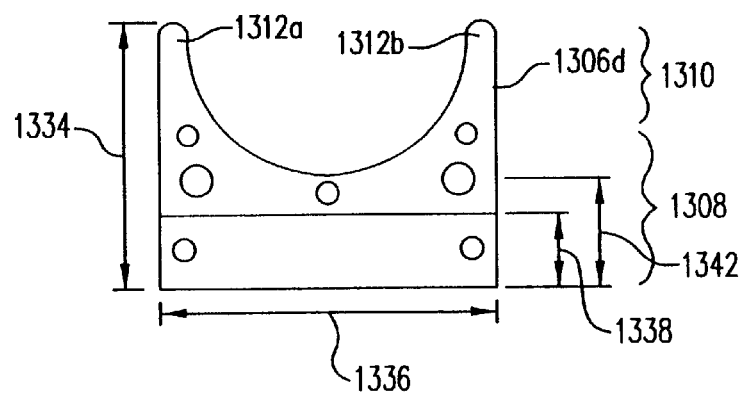
FIG. 15 is a front elevational view depicting a clip for connecting a roller to a cable tray according to an embodiment of the present invention.

FIGS. 13–15 depict a clip device for retaining a roller 1302 on a cable tray 1304. The clip 1306*a*, 1306*b* has a base portion 1308 and an upper portion 1310 with two upstanding ears 1312*a*, 1312*b* defining a cradle region 1314 with a U-shaped cross-section for receiving the circular-cross-section axle 1204. The lower portion 1308 includes a holding region such as angled region 1316 and a support surface 1318. A holding region can also be curved, cam-shaped or stepped and can be rigid, resilient or moveable (such as a spring-urged latch). The clips 1306*a*, 1306*b* are held to members of the cable tray 1304 by capturing between the holding or angled region 1316 and anchors such as J-bolts 1322*a*, 1322*b*. Anchors can be angled, rather than hooked, or moveable, such as a spring-urged latch. Passageway 1324*a*, 1324*b* may be provided through the clip 1306*a*, 1306*b* for accommodating the anchors 1322*a*, 1322*b* and the anchors 1322*a*, 1322*b* may be held in place by, e.g., nuts 1326*a*, 1326*b* engaging the threaded ends of the anchors 1322*a*, 1322*b*. Anchors can also be held in place by ratchet or latch devices, welds, rivets or adhesives. The clips 1306*a*, 1306*b* can be provided in a wide variety of sizes to accommodate different ranges of axle sizes. In the depicted embodiment, the clip has a depth 1332 of about 1.5 inches, a height 1334 of about 1.7 inches, a width 1336 of about 2.3 inches, a lower portion height 1338 of about 0.5 inches, a passageway height 1342 of about 0.7 inches, a support surface depth 1344 of about 1 inch and a holding portion angle 1346 of about 15°. This device can be used to accommodate a number of sizes of axles, including 2 inches diameter rigid conduit and ¾ inch solid steel shaft. The device can be used with a variety of widths of cable tray by adjusting the width of the roller such as by using different lengths of PVC middle spacer material 1352 to adjust the length 1354 of the roller 1302.

Figure 16:
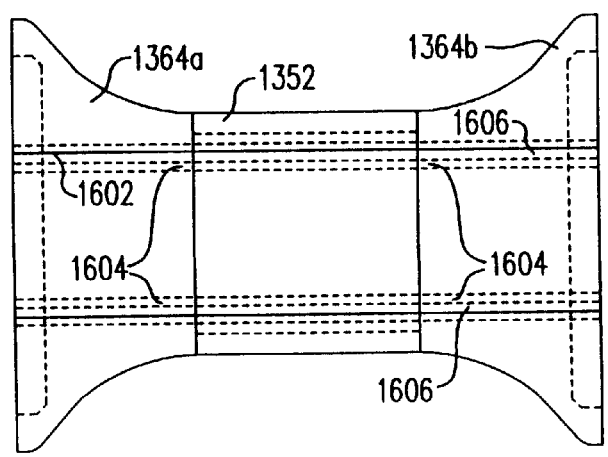
FIG. 16 is a front elevational view of a roller according to an embodiment of the present invention.

FIG. 16 depicts one embodiment of a roller in which a central circular-cross-section cavity 1602, e.g., having a diameter of about 2½ inches, holds bushings or bearings 1604, such as nylon sleeves or Teflon-impregnated nylon or Teflon-silicon sleeves to provide for ease of rolling of the roller with respect to the axle, and/or shims or spacers 1606 to accommodate, e.g., a 2 inch axle. Other sizes of inserts, bearings and/or sleeves can be used for accommodating other sizes of axles. Using holes 1362*a*, 1362*b*, 1362*c* in the end flanges of the rollers 1364*a*, 1364*b*, rollers can be bolted face-to-face, e.g., to make 6 inches sheath structures. In order to make the rollers stronger on pulling and tensile strength, four ¼ inch bolts can be inserted into four evenly-spaced holes 1362*a*, 1362*b*, 1362*c* (FIG. 13) on each roller. Multiple rollers can be used on each shaft or axle 1204 to pull multiple cables at one time. Rollers may be made wider to allow wider rollers for multiple pulls on that roller. The rollers can vary in outside diameter to accommodate larger pulling requirements.

One advantage of the depicted clip is the ease with which the shaft 1204 can be disengaged from one (or both) clips 1306*a*, 1306*b*, e.g., for moving the cable from a position on top of the roller to a position below the roller on the cable tray. This procedure can be accomplished in about 10 seconds for snapping the roller out and back. In one embodiment, the ears incline slightly inward above the centerline of the axle to hold the axle in place, but are resilient, to permit disengaging the axle from the clip by lifting up. Other devices for retaining the axle can be used such as spring-urged latches, gates, bushings and the like.

In one embodiment, the clips 1306a, 1306b are made from a plastic material such as polyvinyl chloride. It is also possible to make the clip from other materials including metals such as zinc-plated steel, e.g., for hazardous locations. Although the depicted embodiment shows attachment of the clips to an I-beam cable tray, the clips can also be attached to C-channel cable trays.

In light of the above description, a number of advantages of the present invention are apparent. Bundles can be formed in a shorter amount of time than was needed for previous methods since, among other reasons, wires are withdrawn from several reels simultaneously, and repositioning of the components of the bundles is unnecessary. Because two or more wires are being formed into the bundles simultaneously, accuracy of bundle formation is increased.

Although the present invention has been described by way of a preferred embodiment and certain variations and modifications, other variations and modifications can also be used, the invention being defined by the following claims.

What is claimed is:

1. Apparatus for supporting a roller on a cable tray comprising:

a U-shaped receiving surface for receiving an axle of said roller a support surface, coupled to said U-shaped receiving surface, for resting on a portion of said cable tray a first holding region, coupled to said support surface, for engaging a first edge of said cable tray; and a passageway, coupled to said first holding region, for receiving a hook-shaped anchor wherein at least said first holding region and said U-shaped receiving surface are formed as a single unitary and integral piece; and wherein said receiving surface is configured to hold said axle to define a first axle axis, and wherein said holding region comprises a first region defining a first plane substantially parallel said axle axis and a second region oblique to said first plane, defining said first holding region between said first region and said second region.

2. Apparatus as claimed in claim 1 wherein said axle is received in said receiving region, and wherein said axle can be removed from said U-shaped receiving surface by lifting upwards.

3. Apparatus as claimed in claim 1 wherein said U-shaped receiving surface defines first and second ears which are resiliently deflectable away from one another.

4. Apparatus as claimed in claim 1 wherein said first passageway is substantially parallel to said first plane.

5. Apparatus as claimed in claim 1 wherein said receiving surface is configured to accommodate a range of axle diameters.

6. Apparatus as claimed in claim 1 wherein said receiving surface is configured to accommodate axle diameters between about ¾ inch and about 2 inches.

7. Apparatus, as claimed in claim 1, wherein said roller is provided with a bearing to accommodate rotation with respect to said axle.

8. Apparatus, as claimed in claim 7 wherein multiple rollers are provided on a single axle.

9. Apparatus as claimed in claim 1 further comprising means for removably retaining said axle in said U-shaped means.

10. Apparatus as claimed in claim 9 wherein said U-shaped means comprises polyvinyl chloride.

11. Apparatus as claimed in claim 1 wherein said first edge of said cable tray is adjacent upper and lower planar surfaces of said cable tray and wherein said first holding region is spaced from and avoids contact with at least one of said upper and lower planar surfaces.

* * * * *